United States Patent [19]

Hanzawa et al.

[11] Patent Number: 5,542,194
[45] Date of Patent: Aug. 6, 1996

[54] SILICON CARBIDE BODY FOR RADIATING FAR-INFRARED RADIATION, DRYING APPARATUS INCLUDING THE BODY, AND FIRING APPARATUS INCLUDING THE BODY

[75] Inventors: Shigeru Hanzawa, Kagamihara; Tsuneo Komiyama, Toki, both of Japan

[73] Assignee: NGK Insulators, Ltd., Nagoya, Japan

[21] Appl. No.: 188,323

[22] Filed: Jan. 26, 1994

[30] Foreign Application Priority Data

Feb. 2, 1993 [JP] Japan .................. 5-015708
Dec. 27, 1993 [JP] Japan .................. 5-329415

[51] Int. Cl.⁶ .................................................. F26B 3/34
[52] U.S. Cl. .................................................. 34/266
[58] Field of Search .................................................. 34/266

[56] References Cited

U.S. PATENT DOCUMENTS

| | | | |
|---|---|---|---|
| 4,263,500 | 4/1981 | Springer et al. | 219/377 |
| 4,668,452 | 5/1987 | Watanabe et al. | 264/63 |

FOREIGN PATENT DOCUMENTS 4363578 12/1992 Japan .................. 34/266

OTHER PUBLICATIONS

Japanese Patent Abstract 63-104681, May 10, 1988 "Coating Dryer Provided with Far Infrared Panel Heater".
Japanese Patent Abstract 63-123909, May 27, 1988 "Far Infrared Ray Heater of Gas Type".
Japanese Patent Abstract 2-237677, Sep. 20, 1990 "Far Infrared-Ray Heating Furnace".

Primary Examiner—Henry A. Bennett
Assistant Examiner—Dinnatia Doster
Attorney, Agent, or Firm—Ronald J. Kubovcik

[57] ABSTRACT

A body for radiating far-infrared radiation possesses high emissivity in the wide range corresponding to all the wave lengths which far-infrared radiation possesses, excellent anticorrosivity and intensity properties. The body includes a ceramic containing SiC, preferably a Si—SiC ceramic. A drying apparatus uses the body for radiating far-infrared radiation, the body including a ceramic containing SiC. A firing apparatus uses the body for radiating far-infrared radiation, the body including a ceramic containing SiC.

5 Claims, 4 Drawing Sheets

SILICON CARBIDE BODY FOR RADIATING FAR-INFRARED RADIATION, DRYING APPARATUS INCLUDING THE BODY, AND FIRING APPARATUS INCLUDING THE BODY

BACKGROUND OF THE INVENTION AND RELATED STATEMENT

The present invention relates to a body for radiating far-infrared radiation. More specifically, the present invention relates to a body for radiating far-infrared radiation in which a SiC ceramic is employed, to a drying apparatus including the body, and to a firing apparatus including the body.

Far-infrared radiation possesses small reflection and transmission of energy since far-infrared radiation has almost the same range of wave lengths as the wave lengths which water, an organic matter, a human body, and the like can absorb. Therefore, far-infrared radiation can transfer energy efficiently to such subjects. Further, far-infrared radiation raises the temperatures of the inner portion and the outer portion of such a subject almost simultaneously because resonance is caused by the correspondence of the above-mentioned wave length and heat is generated inside the subject since far-infrared radiation is transferred up to the deep portion of an organic matter and the like. For such reasons, extensive research has recently been made into far-infrared radiation.

Far-infrared radiation can be widely applied to various kinds of heat treatment such as drying, heating, roasting, fermentation, ripening, and heat insulation. For example, it can be used for not only predrying plastics, drying spot coating, a fish oven having continuous system, roasting coffee, fermenting tea, heating food such as pancakes and meat, but also devices for medical treatment by irradiation with far-infrared radiation.

It is most preferable for the body to radiate far-infrared radiation having a frequency corresponding to the frequency which the subject to be treated possesses in view of the efficiency of the energy. However, it is inappropriate, in view of industrial costs, for producing individually each ceramic for radiating far-infrared radiation, having a frequency corresponding to an inherent frequency of each of the subjects to be treated.

Therefore, extensive research has been made into materials having high emissivity in a wide range corresponding to all the wave lengths which far-infrared radiation possesses so as to be used as a material for a body for radiating far-infrared radiation. As ceramic materials, alumina and cordierite are well known.

However, the above-described ceramic materials are still not satisfactory, and the emissivity of such a material has room for further improvement.

Moreover, a body for radiating far-infrared radiation is often exposed to various kinds of chemical substances during heat treatment, and there has been some problems regarding the anticorrosivity against these chemical substances.

Further, it is required that the material itself possesses high strength so as to avoid breakage during handling.

SUMMARY OF THE INVENTION

Hence, the present invention solves the aforementioned problems. One of the objects of the present invention is to provide a body for radiating far-infrared radiation, the body having high emissivity in a wide range corresponding to all the wave lengths which far-infrared radiation possesses and being excellent in anticorrosivity and intensity properties, etc. Another object of the present invention is to provide a drying apparatus and a firing apparatus, both of them using the body for radiating far-infrared radiation.

The present inventors have earnestly conducted into various kinds of materials and found that the above objects can be achieved by using a ceramic containing SiC, which led to the completion of the present invention.

Therefore, a body for radiating far-infrared radiation of the present invention is characterized by including a ceramic containing SiC.

The body for radiating far-infrared radiation of the present invention is excellent in emissivity in a wide range corresponding to all the wave lengths which far-infrared radiation possesses. Therefore, the body is applicable to various kinds of uses, and the cost for energy can be reduced.

Moreover, a body for radiating far-infrared radiation of the present invention possesses excellent anticorrosivity and mechanical strength. Therefore, the body can be applied to various uses and increase the life span of products, and the breakage of the body for radiating far-infrared radiation can be avoided during handling.

DETAILED DESCRIPTION OF THE INVENTION

Figure 1:
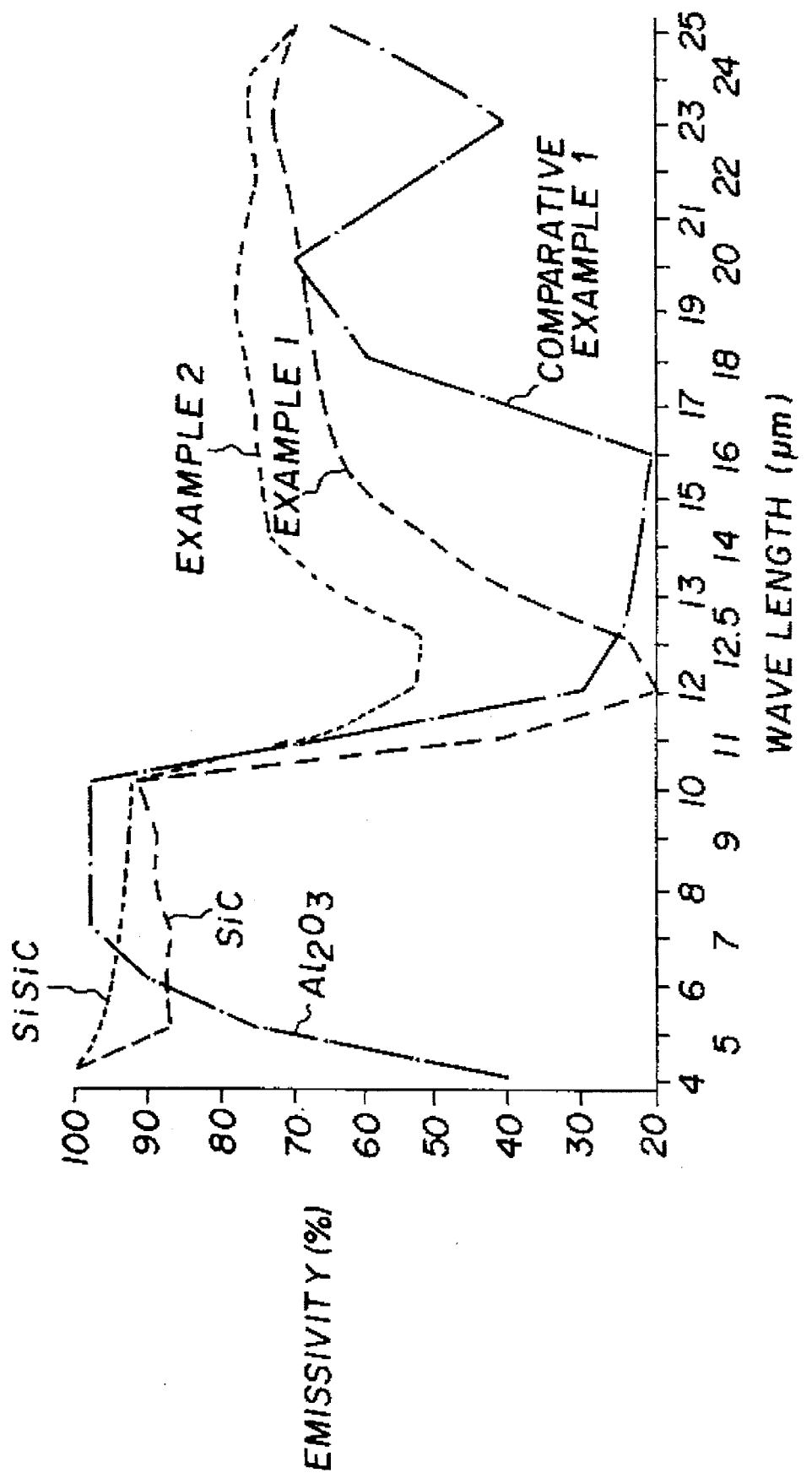
FIG. 1 shows characteristics of the radiation by the body for radiating far-infrared radiation of the present invention and by a body of a conventional type.

A body for radiating far-infrared radiation of the present invention is hereinbelow described.

A body for radiating far-infrared radiation of the present invention includes a ceramic containing SiC. ("A ceramic containing SiC" includes not only a ceramic which consists of only SiC ceramic, but also a ceramic containing at least one other substance, for example, an Si—SiC ceramic.) Therefore, the body can be used for various kinds of treatment such as drying, heating, roasting, thermal insulation, and fermentation for various kinds of subjects to be treated because the body is excellent in emissivity in the wide range corresponding to all the wave lengths which far-infrared radiation possesses. In addition, the body meets the present demand of energy-saving because energy is required during the above-described treatment (usually, energy which the body for radiating far-infrared radiation receives from an exothermic source such as gas) since the body is excellent in emissivity.

Moreover, since the body for radiating far-infrared radiation of the present invention is particularly excellent in emissivity in the range of the wave lengths of about 4–8 μm, which are the best wave lengths for the thermal treatment of water, the body is applicable particularly to treatment such as heating and evaporating water contained in the substance to be treated.

A body for radiating far-infrared radiation, which contains a Si—SiC ceramic, possesses stable and high emissivity in a wide range corresponding to all the wave lengths which far-infrared radiation possesses without a sharp decrease of the emissivity around the range corresponding to the wave length of about 12 μm, unlike a conventional body for radiating a far-infrared radiation of alumina or the like.

It is preferable that the body for radiating far-infrared radiation has a surface roughness of Ra 0.5 μm or more because the emissivity is further improved. The surface roughness can be adjusted by, for example, sandblasting.

The body for radiating far-infrared radiation of the present invention is excellent in anticorrosivity against various kinds of chemical substances because the body includes a ceramic containing SiC. Therefore, the body can be suitably used for thermal treatment such as drying, heating, and roasting of even matters having a possibility of generating various kinds of chemical substances.

Further, for the above-described reason, the body for radiating far-infrared radiation of the present invention possesses high strength (about 2500 kgf/cm$^2$ of four-point bending strength standardized by JIS R 1601 under normal conditions). Therefore, it is not prone to breakage during handling such as working, assembling, and conveying. The ratio of β-SIC in the SiC contained in the Si—SiC ceramic is preferably high to improve the thermal shock resistance.

Furthermore, the possibility of workers' accidental injury during the above-mentioned handling caused by breakage of the body can be reduced because the shape of the broken portion does not become sharp.

The application of the body for radiating far-infrared radiation is not restricted if only the application is for an apparatus, method, or the like, for thermal treatment to the subjects to be treated, for example, a drying apparatus, a firing furnace, a member such as a lining material, a heating apparatus (including a cooking apparatus such as a hot plate for grilling meat and a heating and cooking plate for a microwave range), and an apparatus for fermentation.

Particularly, the firing apparatus having a body for radiating far-infrared radiation as a lining material and the like can be suitably employed in firing operations for ceramics, or the like, in which a series of processes from drying (removal of water) to firing are conducted.

In this case, particularly when a body for radiating far-infrared radiation containing a Si—SiC ceramic is used as a lining material, it gives the advantages described below in a firing process.

First, it enhances durability of the firing apparatus since a Si—SiC ceramic possesses excellent anticorrosivity, antioxidizing ability, etc. The liner is hardly corroded even when a material which generates corrosive gas during firing is fired to obtain a ceramic. It can avoid marring the beauty of the external appearance of the obtained product, which is caused by fine powders falling off the liner on the product when the liner is oxidized and deteriorated.

Further, since a Si—SiC ceramic possesses excellent mechanical strength, the production cost for the firing apparatus can be reduced by using a thin liner, and the thermal efficiency can be enhanced. The use of a setter in combination with the liner further enhances the thermal efficiency.

Furthermore, since a Si—SiC ceramic possesses excellent thermal conductivity, heating is quickly leveled in the firing apparatus having a Si—SiC ceramic as a liner, which promotes the formation of a homogeneously fired product.

It is noted that the term "liner" includes a partition wall in a tunnel kiln and the like.

In the apparatus for the thermal treatment as mentioned above, the use of such a body for radiating far-infrared radiation only needs to be supplied thermal energy from any exothermic source, for example, electricity, gas, or oil having high temperature.

The application of the body for radiating far-infrared radiation to a drying apparatus only needs to place the body close to or connected to an exothermic source such as Nichrome wire.

Another means which can be employed so as to generate far-infrared radiation from the body for radiating far-infrared radiation of the present invention is a means in which wave energy is transferred from an arbitrary wave source to the body, for example, a means in which resonance is caused by irradiating a microwave or the like to the body for radiating far-infrared radiation of the present invention disposed in a microwave range.

Next, the process for producing a body for radiating far-infrared radiation of the present invention is hereinafter described.

The above-mentioned SiC ceramic can be produced by an ordinary process.

On the other hand, as a process for producing an Si—SiC ceramic, a predetermined amount of C powder, SiC powder, binder, and water or an organic solvent are first kneaded, and then, formed to have a compact having a desired shape. Subsequently, the compact is placed in decompressed inert gas or in a vacuum under a metal Si atmosphere and is impregnated with metal Si.

Another process for producing an Si—SiC ceramic is that at least one graphite sheet and/or at least one carbon sheet are(is) disposed in a crucible, or the like, in which metal Si is packed, and then, the crucible is heated to melt the metal Si. SiC is produced by the reaction between Si and C which is a component of the above-mentioned sheet by a capillary effect, and at the same time, excessive Si is left.

In this process, natural products such as bamboo, wood, and insects may be used instead of the above-mentioned sheets. In this case, there is obtained a body for radiating far-infrared radiation having a shape of the natural product (or a workpiece of such a natural product, for example, a bamboo work), for example, a ceramic charcoal.

In any of the above-described processes for producing a Si—SiC ceramic, the amount of β-SIC in the SiC components in the ceramic or the remaining Si can be controlled by appropriately changing the conditions for the reaction such as the density of the compact, the firing temperature, and the reaction temperature.

The present invention is hereinafter described in more detail by way of Examples and Comparative Examples. However, the present invention is not restricted to the following Examples.

EXAMPLE 1

To β-SIC powder (average particle diameter of 1 μm) were added B$_4$C of 0.5 wt % and water of 3 wt %, followed by mixing these using SiC balls in a pot for 2 hours. A compact having dimensions of 60 mm×60 mm×8 mm (thickness) was formed of the-obtained raw material. The compact was heated up to 1800° C. in an Ar atmosphere, and then heated up to 2200° C. in a vacuum to obtain a SiC ceramic.

A test piece (a body for radiating far-infrared radiation) having dimensions of 40 mm×40 mm×5 mm (thickness) was cut out. To the test piece an exothermic source was connected. This test piece (Ra 1.0 μm) was heated up to 200° C., and the test piece was measured for the emissivity of far-infrared radiation. The results are shown in FIG. 1. In FIG. 1, the emissivity is indicated by a ratio to a black body which emissivity is regarded as 100.

EXAMPLE 2

α-SiC powder of 90 weight parts, α-SiC powder of 60 weight parts (average particle diameter of 30 μm), and α-SiC powder of 40 weight parts (average particle diameter of 2 μm) were mixed. To the obtained mixture of 100 weight parts, C powder of 10 weight parts (average particle diameter of 1 μm), a binder of 2 weight pans, and water of 3 weight parts were added so as to produce a premix. Then, the premix was subjected to a pressure of 500 kgf/cm$^2$ using a mold to obtain a compact having dimensions of 50 mm×50 mm×5 mm (thickness).

The obtained compact, being kept in contact with metal Si in a vacuum, was maintained at 1800° C. for two hours to obtain a finely sintered Si—SiC ceramic. A test piece having the same size as the test piece in Example 1 was cut out of this ceramic. The surface of the test piece was subjected to sandblasting by corundum particles of 80# to have a surface roughness of Ra 150 μm. The test piece was measured for emissivity in the same manner as in Example 1. The results are shown in FIG. 1.

Comparative Example 1

The test piece was obtained in the same manner and subjected to the same process as in Example 1 except that an $Al_2O_3$ ceramic was used as the ceramic material. The results are shown in FIG. 1.

EXAMPLE 3

Figure 2:
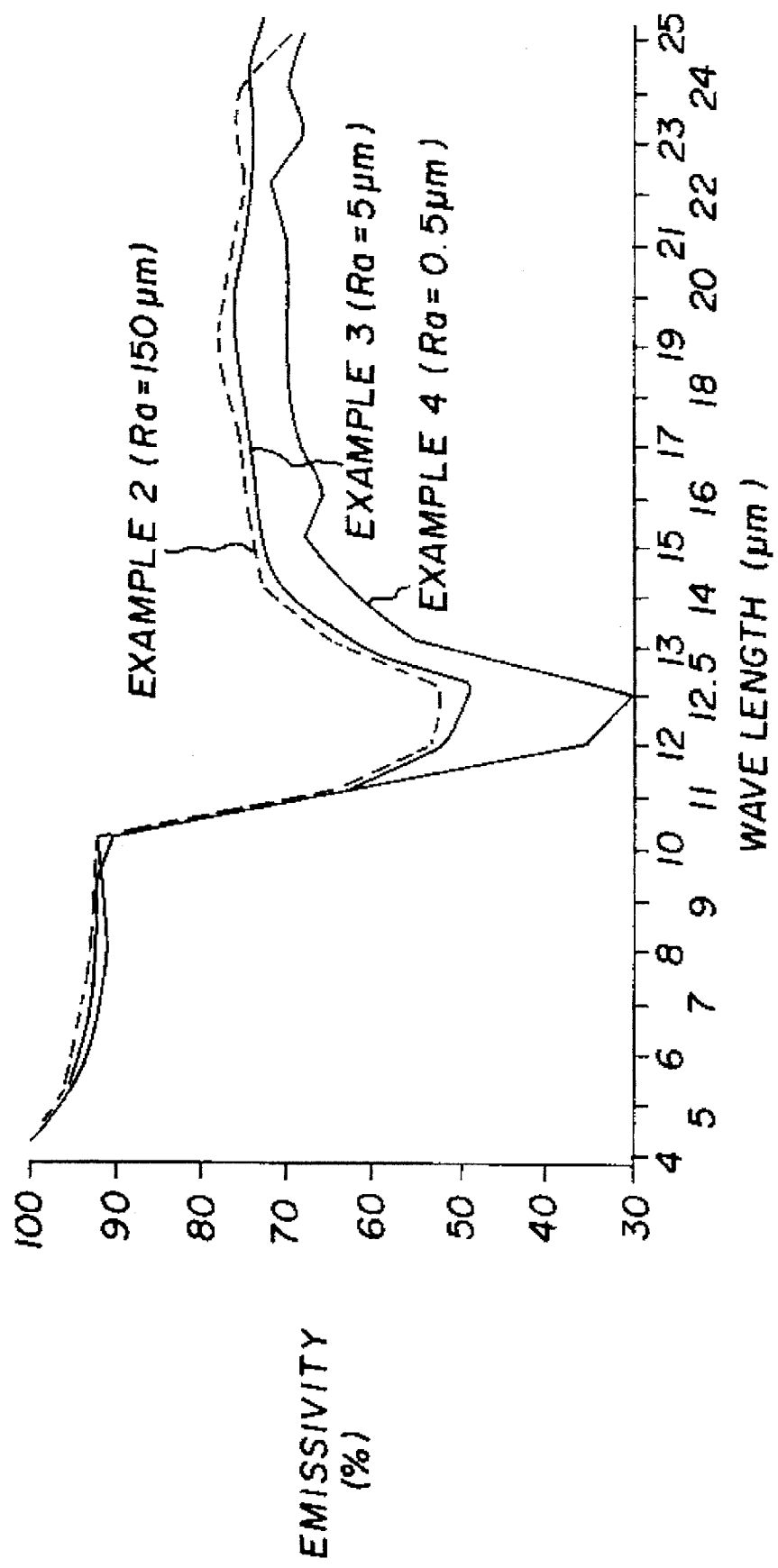
FIG. 2 shows characteristics of the radiation by the body for radiating far-infrared radiation of the present invention.

The test piece was obtained in the same manner and subjected to the same process as in Example 2 except that the surface roughness of the test piece was adjusted to Ra 5 μm. The results are shown in FIG. 2. The results obtained in Example 2 are also shown in FIG. 2.

EXAMPLE 4

The test piece was obtained in the same manner and subjected to the same process as in Example 2 except that the surface roughness of the test piece was adjusted to Ra 0.5 μm. The results are shown in FIG. 2.

As is obvious from FIG. 1, the bodies for radiating far-infrared radiation of Examples 1 and 2 within the scope of the present invention indicate that each of the bodies possesses an excellent emissivity in the wide range corresponding to all the wave lengths which far-infrared radiation possesses.

Additionally, it is clear from FIG. 2 that the emissivity is excellent when the surface roughness Ra of the Si—SiC ceramic is larger than 0.5 μm.

EXAMPLE 5

A SiC ceramic plate having dimensions of 400 mm×350 mm×5 mm (thickness) was obtained in the same manner as in Example 1. The obtained ceramic plate (Ra 2 μm) was disposed as a liner inside the electric furnace which employed Nichrome wire as an exothermic source so as to obtain a drying apparatus.

A compact as a subject to be treated (dried) was formed as follows: Water of 17 weight parts and water glass of 2 weight parts were added to $Si_3N_4$ powder, which has an average particle diameter of 5 μm, of 83 weight parts so as to obtain a slurry. The slurry was poured into a pot having an outside diameter of 100 mm, an inside diameter of 80 mm, and a height of 100 mm to obtain a compact.

The compact was disposed inside the above-described drying apparatus and dried according to the drying schedule (1) mentioned below. The occurrence of cracks in the compact was observed, and the results are shown in Table 1.

[ Drying Schedule ]

$$20° C. \times 1 \text{ hour} \rightarrow 40° C. \times 1 \text{ hour} \rightarrow 60° C. \times 1 \text{ hour} \rightarrow 100° C. \times 1 \text{ hour} \quad (1)$$

$$20° C. \times 30 \text{ min.} \rightarrow 40° C. \times 30 \text{ min.} \rightarrow 60° C. \times 20 \text{ min.} \rightarrow 100° C. \times 30 \text{ min.} \quad (2)$$

EXAMPLE 6

A Si—SiC ceramic plate was obtained in the same manner as in Example 2. At least two compacts were obtained in the same process as in Example 5. One compact was dried according to drying schedule (1). Another compact was dried according to drying schedule (2). The results are shown in Table 1.

Comparative Example 2

A stainless plate was used as a liner of the drying apparatus, and the same processes were used as in Example 6. The results are shown in Table 1.

Comparative Example 3

An $Al_2O_3$ plate was used as a liner of the drying apparatus, and the same processes were used as in Example 5. The results are shown in Table 1.

TABLE 1

| | Drying Schedule | Crack (Lengths, Numbers) |
|---|---|---|
| Example 5 | ① | None |
| Example 6 | ① | None |
|  | ② | None |
| Comp. Exam. 2 | ① | 80 mm and 70 mm, 2 cracks |
|  | ② | 100 mm and 70 mm, 2 cracks |
| Comp. Exam. 3 | ① | 80 mm, 1 crack |

As is obvious from Table 1, the drying apparatuses of the present invention shown in Examples 5 and 6 can conduct excellent drying.

EXAMPLES 7

A Si—SiC plate [200 mm×100 mm×5 mm (thickness), Ra 150 μm] was obtained in the same manner as in Example 2. The Si—SiC plate was disposed on a metal plate (hot plate) having slits in an apparatus for grilling meat (manufactured by SHINPO Inc.) The Si—SiC plate occupied about the half of all the surface area of the metal plate.

Then, the Si—SiC plate was heated up to about 250° C. Three pieces of beef meat were placed on the Si—SiC plate, each piece having dimensions of about 60 mm×60 mm×10 mm (thickness). When 20 seconds had passed, one of the pieces was turned over. The piece was grilled 20 seconds more, and then taken out to observe the conditions (condition of the inner portion of the piece, transformation of the meat, etc.). The results were shown in Table 2.

Another piece of the beef meat was turned over when 40 seconds had passed, and further grilled for 40 seconds. The other piece of the beef meat was turned over when 60 seconds had passed, and further grilled for 60 seconds. The conditions of the pieces were observed, and the results are shown in Table 2.

Comparative Example 4

Another three pieces of beef meat having the same conditions as the above-described pieces were placed on the other half portion of the metal plate (the portion where the Si—SiC plate was not disposed). Grilling the three pieces of meat was started at the same time as the grilling started in Example 7, and each of the three pieces was grilled in the same condition as in Example 7. The results are shown in Table 2.

Ra 150 μm was obtained in the same manner as in Example 2. This Si—SiC plate was disposed inside a microwave range [NE-1000 (trade name) manufactured by National, 200 V, 60 Hz, input current of 2060 W, rated high frequency output of 1050 W], and then, was operated so as to observe the temperature change with the passage of time on the surface of the Si—SiC plate. The results are shown in FIG. 3.

Figure 3:
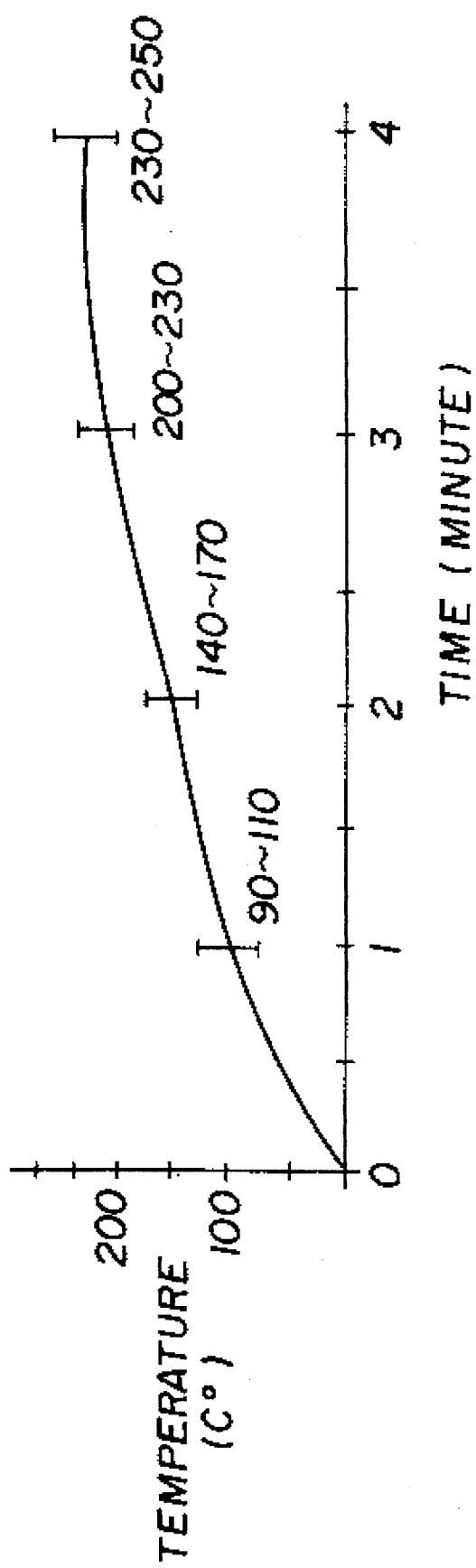
FIG. 3 shows characteristics of the temperature increase of the surface of the Si—SiC plate disposed in a microwave range when the body for radiating far-infrared radiation of the present invention is heated with a microwave range.

FIG. 3 shows that if only the body for radiating far-infrared radiation is disposed inside a microwave range, the function of an oven can be added to the microwave range.

Further, the surface of the Si—SiC plate could be heated, when 3 minutes had passed, up to about 200° C., which is hot enough to bake cookies or cakes. This shows that the temperature increase of the surface of the plate is quick enough.

EXAMPLE 9

Figure 4:
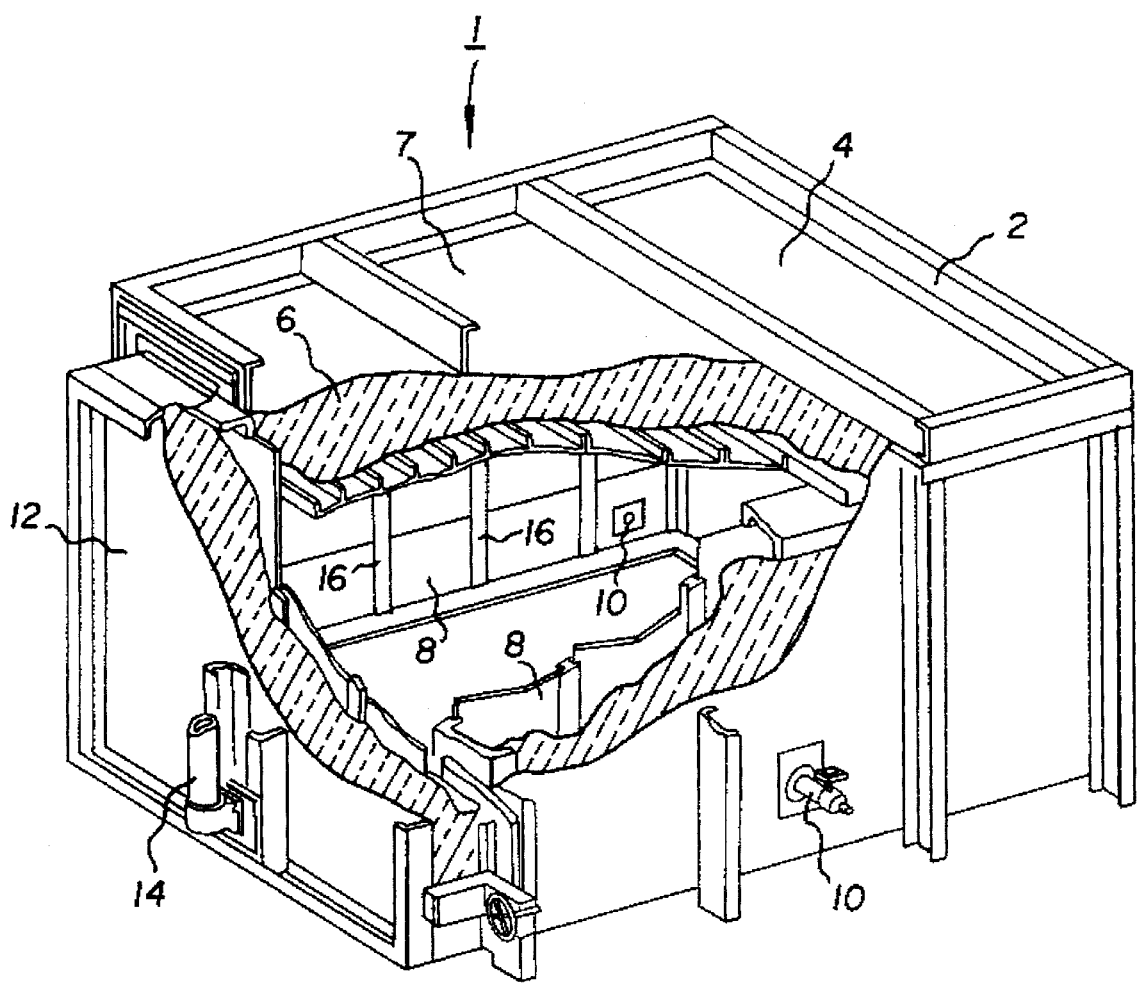
FIG. 4 is a perspective view of a firing apparatus, a part of which was cut-away, of the present invention.

FIG. 4 illustrates an example of a firing apparatus of the present invention. In the drawing, the firing apparatus 1 has

TABLE 2

| | Example 7 | | | Comparative Example 4 | | |
|---|---|---|---|---|---|---|
| Heating Time | Conditions of Surface | Meat Conditions inside pieces | Dimensions (mm) | Conditions of Surface | Meat Conditions inside pieces | Dimensions (mm) |
| 20 seconds for each surface | a little scorching | Both a mid layer and intermediate layers are pink and just right for eating. | — | scorching | Blood remains in both a mid layer and intermediate layers. | — |
| 40 seconds for each surface | a little scorching | Both a mid layer and intermediate layers are pink and just right for eating. | — | much scorching | Blood remains in a mid layer. | — |
| 60 seconds for each surface | a little scorching | Both a mid layer and intermediate layers are pink and just right for eating. | 55 × 55 × 8 | much more scorching | Both a mid layer and intermediate layers are pink and just right for eating. | 50 × 50 × 7 |

Table 2 shows that a body for radiating far-infrared radiation of the present invention provides meat pieces each grilled uniformly from the surface to the mid portion for a short period of time, and moreover, with little change in size. Thus, the body for radiating far-infrared radiation of the present invention can provide juicy grilled meat without significant loss of tasty components such as water, oils, and amino acids, which are contained in beef meat.

As a result of sampling of the pieces of beef meat obtained in Example 7 and Comparative Example 4 by 25 people, 22 people answered that the pieces obtained in Example 7 taste better than the pieces obtained in Comparative Example 4 though three people answered that both sorts of pieces taste almost the same.

Further, it is shown by the Table 2 that the pieces obtained in Example 7 have less scorching than the pieces obtained in Comparative Example 4. Therefore, the meat has less carbide (excessive scorching), the carcinogenic action of which has been recently apprehended in the newspapers, than the pieces obtained by a conventional apparatus for grilling meat. This result cioncides with the present health concerns of the worldwide population.

Furthermore, the scorching stuck on the Si—SiC plate of Example 7 could be removed easily only by immersing the plate in water for about 10 hours. After that, no scorching remained, and the starting conditions (the conditions as good as new) were restored.

EXAMPLE 8

A Si—SiC plate having dimensions of 100 mm×100 mm×10 mm (thickness) and having a surface roughness of a housing 7 and a liner 8 in its structure. The housing 7 includes an outer frame 2, thermal-resistant steel plate 4, and a heat insulating layer 6. To the firing apparatus 1 is provided a door 12, which is equipped with an air pipe 14. The atmosphere in the apparatus can be adjusted as desired though the air pipe 14. Each of the side walls is equipped with a gas burner 10 as an example of a thermal source.

A Si—SiC ceramic of the present invention is employed as a liner 8 of the firing apparatus 1. In this example, the Si—SiC ceramic liner 8 is supported by stays 16 so as to stand in the perpendicular direction.

[Thermal Efficiency Test].

In the firing apparatus 1 shown in FIG. 4, the liner 8 was composed of the Si—SiC ceramics (5 mm in thickness, Ra 150 μm) obtained in Example 2. The apparatus had a capacity of 6 m³. Inside the firing apparatus were disposed SiO—SiC type setters having dimensions of 450 mm×450 mm×12 mm (thickness) and having a weight of 7 kg and mullite stays for supporting the setters. One stage consists of 16 setters, and 26 stages were disposed. Stays for supporting the setters were disposed so as to keep the distance of each stage to be 50 mm. The total weight of the members used for the setters is 3200 kg.

Then, compacts to be fired (compacts for tableware, total weight of 1000 kg) were placed on the setters, and the above-described door was closed.

The temperature in the firing apparatus was raised up to 1250° C. (the highest temperature) from the room temperature for ten hours. The temperature was kept for 1.5 hours, and then cooled down to the room temperature for 10.5 hours so as to obtain table ware. Table 3 shows the amount of LPG required for firing and the weight of the table ware made by firing with 1 kg of LPG.

EXAMPLE 10

The preparation of the firing apparatus and the firing procedure was taken in the same manner as in Example 9 except that Si—SiC ceramic setters (450 mm×450 mm×5 mm (thickness), 3 kg, Ra 150 µm) were used and that 32 stages were disposed. The results are shown in Table 3.

Comparative Example 5

The preparation of the firing apparatus and the firing procedure was taken in the same manner as in Example 9 except that heat resistant bricks having a thickness of 100 mm (A-46, Class A, Group 7, JIS R 2611) were used to form the liner 8. The results are shown in Table 3.

Comparative Example 6

The preparation of the firing apparatus and the firing procedure were taken in the same manner as in Example 9 except that a fibered $Al_2O_3$—$SiO_2$ ceramic having a thickness of 150 mm was used to form a liner 8. The results are shown in Table 3.

Comparative Example 7

The preparation of the firing apparatus and the firing procedure were the same as in Example 10 except that a fibered $Al_2O_3$—$SiO_2$ ceramic having a thickness of 150 mm was used to form the liner 8. The results are shown in Table 3.

TABLE 3

| | Amount of LPG required for firing (Kg/Firing apparatus) | Weight of Products obtained by firing using 1 kg of LPG (Kg) |
|---|---|---|
| Example 9 | 370 | 2.7 |
| Example 10 | 330 | 3.9 |
| Comparative Example 5 | 600 | 1.7 |
| Comparative Example 6 | 410 | 2.4 |
| Comparative Example 7 | 360 | 3.6 |

As shown in Table 3, according to the firing apparatus of the present invention in Examples 9 and 10, the amount of LPG to be used for firing can be reduced, and it means that the thermal efficiency is excellent. According to Example 9 or 10, the weight of the products produced by firing with LPG of 1 kg can be increased to be 1.1–2.3 times as much as those produced in Comparative Example 5 or 6, in which conventional firing apparatuses were used.

Note, in Example 9 or Example 10, a single kiln like a shuttle kiln was used as the firing apparatus. However, the firing apparatus is not restricted to this type. The continuous kiln, for example, a tunnel kiln or a roller hearth kiln may also be used.

Further, the portion having the liner 8 is not restricted to the perpendicular portion, and a liner 8 may be disposed to the horizontal portion. Furthermore, it is also possible for the liner to be used as a partition wall disposed so as to separate the inner space into regions for each thermal treatment in a tunnel kiln and the like.

[Measurement of thermal conductivity]

The Si—SiC ceramic obtained in Example 2 and other materials were measured respectively for thermal conductivity λ by laser flashing. The results are shown in Table 4.

In this measurement, the sample was worked so as to have dimensions of 10 mmφ×5 mm (thickness). The laser energy was provided instantaneously to one side of the sample. The other side of the sample was measured for the temperature with an infrared radiation detector from the moment the energy was given, and thereby, the relation between temperature increase and length of time was obtained. The thermal conductivity λ was obtained by multiplying the value of specific heat and specific gravity by the thermal diffusivity which is obtained from the relation obtained above.

As shown in Table 4, Si—SiC ceramic is one of the materials having the highest thermal conductivity λ. Considering the use of materials in an atmosphere having high temperature, Si—SiC ceramic is the most suitable material in view of melting point, strength, and cost.

TABLE 4

| Material | Thermal Conductivity λ (W/m · K) |
|---|---|
| 18-8 stainless steel | 20 |
| Alumina ($Al_2O_3$) | 28 |
| Carbon steel | 41 |
| Pure iron (Fe) | 72 |
| Si—SiC* | 150 |
| Aluminum (Al) | 170 |
| Gold (Au) | 260 |
| Copper (Cu) | 320 |

As described above, there are provided (1) a body for radiating far-infrared radiation which possesses high emissivity in the wide range corresponding to all the wave lengths which far-infrared radiation possesses, excellent anticorrosivity and intensity properties, and the like, (2) a drying apparatus using the body, and (3) a firing apparatus using the body.

What is claimed is:

1. A body for radiating far-infrared radiation, said body being comprised of a Si—SiC ceramic and having a surface roughness Ra of 0.5 µm or more.

2. A body for radiating far-infrared radiation to claim 1, wherein said Si—SiC ceramic contains SiC of 50 wt % or more and Si of 50 wt % or less.

3. A drying apparatus comprising a housing and a liner composed of a body for radiating far-infrared radiation, said body being comprised of a Si—SiC ceramic and having a surface roughness Ra of 0.5 µm or more.

4. A firing apparatus comprising a housing and a liner composed of a body for radiating far-infrared radiation, said body being comprised of a ceramic containing SiC and having a surface roughness Ra of 0.5 µm or more.

5. A firing apparatus according to claim 4, wherein said body contains a Si—SiC ceramic.

* * * * *